United States Patent [19]

Stoddard et al.

[11] 4,177,246
[45] Dec. 4, 1979

[54] WET OXIDATION OF MATERIALS

[76] Inventors: Xerxes T. Stoddard, 4617 W. 27th Ave., Denver, Colo. 80212; Vesper A. Vaseen, 9840 W. 35th Ave., Wheatridge, Colo. 80033; Ruel C. Terry, 3090 S. High St., Denver, Colo. 80210

[21] Appl. No.: 881,012

[22] Filed: Feb. 24, 1978

[51] Int. Cl.² .................... C22B 26/10; C01B 31/20; D21C 11/12
[52] U.S. Cl. .................................. 423/437; 423/207; 162/30 R; 423/DIG. 3
[58] Field of Search ............ 55/73; 423/242, 522, 423/531–543, 512 A, 521, 207, 437, 438, 659, DIG. 3; 162/30 R; 422/184

[56] References Cited

U.S. PATENT DOCUMENTS

| | | | |
|---|---|---|---|
| 2,686,114 | 8/1954 | McGauley et al. | 423/35 |
| 2,721,795 | 10/1955 | McGauley et al. | 423/215.5 |
| 2,932,613 | 4/1960 | Huesler et al. | 423/DIG. 3 |
| 3,696,929 | 10/1972 | Shah | 423/DIG. 3 |
| 3,849,541 | 11/1974 | Bertrand | 55/73 |
| 3,938,738 | 2/1976 | Nagel et al. | 261/DIG. 75 |
| 3,963,611 | 6/1976 | Dardenne-Ankringa et al. | 423/544 |
| 4,049,398 | 9/1977 | Vaseen | 55/36 |

FOREIGN PATENT DOCUMENTS

| | | | |
|---|---|---|---|
| 600803 | 6/1960 | Canada | 423/421 |
| 958322 | 11/1974 | Canada | 261/DIG. 75 |

Primary Examiner—O. R. Vertiz
Assistant Examiner—Gary P. Straub
Attorney, Agent, or Firm—Ruel C. Terry

[57] ABSTRACT

Materials with unfulfilled chemical oxygen demand are oxidized in a liquid environment at superatmospheric temperatures and pressures. The liquid environment is created within a pressure vessel by an inert liquid that is capable of absorbing and dispersing oxygen. Generated heat is captured for further useful work.

3 Claims, 1 Drawing Figure

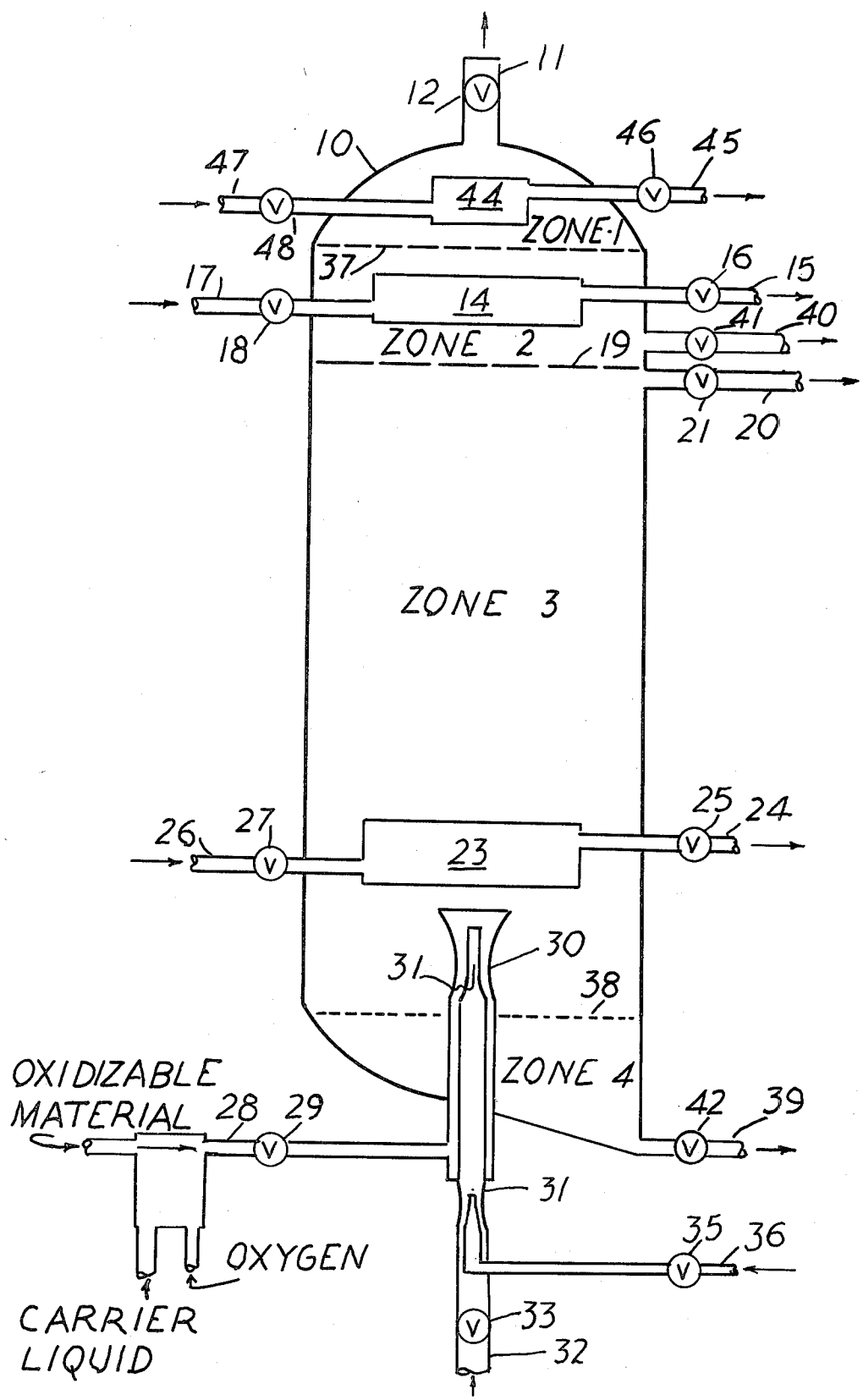

WET OXIDATION OF MATERIALS

BACKGROUND OF INVENTION

This invention relates generally to destruction or alteration of oxidizable materials. More particularly, materials are oxidized to residue in a wet environment with the generated heat captured for further useful work, and with products of reactions removed in a manner to minimize environmental effects.

Until relatively recent times in United States history, anyone with burnable waste material was free to destroy such waste by burning it to ash. Generally, little thought was given to the efficiency of the combustion process, to generated smoke, to accumulated ash, or to the capture of generated heat. With an increasing population, and particularly concentrations of population within confined areas, indiscriminate burning of waste material became an increasing nuisance, and in some cases a hazard to public health.

Through the years more and more restrictions have been placed on indiscriminate burning of waste materials. Today in some localities indiscriminate burning is banned entirely and planned burning in incinerators is severely restricted. Thus burnable waste materials that have a negative value in the sense that additional costs are incurred in their destruction, have an even greater negative value when they must be transported substantial distances to an acceptable destruction site. Generally such acceptable destruction sites are in remote locations where the heat generated in the destruction process has little or no commercial value. On the other hand the burnable waste is normally accumulated at a site where heat has value. In recent times, with the increasing costs of energy sources such as petroleum, heat that could be generated from waste material has considerable value, first in the value of heat itself and second in avoiding the costs of transporting waste material to some remote site.

It is evident that in many cases considerable improvement could be made if waste material could be destroyed at the point of accumulation without violating environmental restrictions. Within strict environmental restraints, conventional burning of waste material is generally impractical due to restrictions on smoke and particulate matter that is permissable in the off-gases.

In some cases waste materials may not be burnable in the strictest sense of conducting a fire, but such materials may be subjected to further oxidation to reduce the volume or to convert hazardous materials to inert materials. Again the process of destruction often is in conflict with environmental restraints.

Among the burnable materials examples include carbonaceous materials such as cellulose, wood products, paper, vegetable fiber and the like. Among the oxidizable materials examples include minerals and their compounds such as sodium, magnesium, calcium, potassium, iron and the like. Anyone of ordinary skill in the art will be able to expand the list of examples considerably.

In order to convert the aforementioned types of materials into residue of significantly smaller volumes or to convert such types of materials from obnoxious form to more acceptable form, within the limits of environmental restraints, burning or dry oxidation generally produces unsatisfactory results. Improved methods can be effected by oxidizing such materials in a wet environment. It is an object of the present invention to teach such methods. Other objects, capabilities and advantages of the present invention will become apparent as the description proceeds.

INTRODUCTION

Materials that lend themselves to rapid oxidation (such as the burning of wood) and materials that lend themselves to relatively slower oxidation in a dry environment (such as iron or coal when subjected to air) generally may also be oxidized in a wet environment. Wet oxidation of materials can be carried out at rapid rates and at relatively low temperatures compared to burning of the same material. For materials that may be oxidized but do not lend themselves to burning, wet oxidation may be conducted at comparable rates, and in some cases faster rates, as compared to dry oxidation.

Generally it is preferable to accelerate the rate of wet oxidation with the resultant generation of heat to a rate that permits withdrawal of heat for further useful work. Such withdrawn heat can be in convenient form, for example steam, in contrast to the sensible heat of a fire that commonly is mixed with smoke and particulate matter. Rapid wet oxidation generally requires pressures in the superatmospheric range, and thus a pressure vessel is required as a reaction chamber.

It is well known in the art that wet oxidation is a useful process that is routinely practiced in such fields as the treatment of municipal wastes. It is further well known that most materials can be fully oxidized at temperature not exceeding about 610° F. (320° C.). If the wet medium contains water it is generally preferable that the water be kept in the liquid phase, which requires corresponding pressures up to about 3200 psig, although pressures much lower can accomplish satisfactory results.

Generally materials to be oxidized in a wet environment all have one feature in common: each has an unfulfilled chemical oxygen demand. Of particular interest in the methods of the present invention are those materials that can be oxidized to residue wherein the residue volume is a relatively small fraction of the original volume. Other materials, such as obnoxious materials, may also be oxidized using the methods of the present invention.

For the methods of wet oxidation to perform efficiently in relatively short residence times, it is necessary that the source of oxygen be applied to the material in such a manner that the oxidation reaction proceeds at an adaptable rate. Generally the bubbling of oxygen or air through a wet medium is unrewarding, in the sense of rapid oxidation rates, unless a special liquid medium is selected. We have found that it is desirable to formulate a slurry wherein the carrier liquid is an inert liquid that is capable of taking oxygen into solution and wherein the material to be oxidized is the solids portion of the slurry. Such slurries should have a suspended solids content in the range of 5% to 80% by weight. The carrier liquid is inert in the sense that it will not react with oxygen nor with the fluid products of oxidation reactions, nor with the material to be oxidized, nor with the residue, at the temperatures and pressures used in the methods of the present invention. We have found that there are numerous candidates for acceptable inert oxygen carrier liquids that may be selected from the family of Hallogenated Hydrocarbons commonly known as fluorocarbons, particulary those that contain eight or more carbon atoms. Those skilled in the art will be able to envision other suitable carrier liquids. We have found that pressure used should fall within the range of about 30 psia to about 3200 psia, and that the temperature used should fall in the range of about 100° F. (38° C.) to about 610° F. (320° C.).

DESCRIPTION OF THE DRAWING

The FIGURE is a diagrammatical vertical section showing the arrangement of apparatus for the methods of the invention.

DESCRIPTION OF THE PREFERRED EMBODIMENT

The reaction chamber, sometimes called the reactor, is a pressure vessel with inlet and outlet flow lines. For purposes of illustration only one inlet point is shown on the drawing, although it is recognized that those skilled in the art will be able to envision other points of entry into the reactor. Similarly, three internal heat exchangers are shown and it is recognized that other locations of heat exchange could be employed. As illustrated, after the reactor comes up to operating conditions, four discrete zones of operations will be formed: zone 1 which is primarily a gas cap, zone 2 which normally will be a liquid of relatively low specific gravity, zone 3 which will be primarily a mixture of oxygen carrier liquid and the material undergoing oxidation and thus will have a relatively high specific gravity compared to the liquid in zone 2, and zone 4 which generally will be a sludge containing the solid residue from the oxidation reactions.

Referring to the drawing a reactor vessel 10 of suitable dimensions, for example 72 inches inside diameter and a liquid height of 130 feet, is established. Within reactor 10 are heat exchangers 44, 14 and 23, such heat exchangers being capable of adding heat to or removing heat from the fluids within reactor 10. Fluids may be introduced into reactor 10 via flow lines 28, 32 and 36. Fluids may be withdrawn from reactor 10 via flow lines 11, 40, 20 and 39.

After the reactor is brought up to operating conditions, as described hereinafter, zone 1 will contain generated gases which are located above the gas-liquid contact 37, zone 2 will contain light liquids located above the liquid-liquid interface 19, zone 3 will contain heavy liquids above the liquid-sludge interface 38 and zone 4 will contain sludge.

By way of examples the methods of the invention are described with regard first to an oxidizable material in slurry form wherein the oxidizable material represents a relatively small proportion of the weight of the slurry; then second to a slurry wherein the oxidizable material represents a relatively large proportion of the weight of the slurry. Unlike other methods of the prior art wherein water is the principal carrier liquid for the oxidizable material, the methods of the present invention use an inert liquid, sometimes called a carrier liquid, that has an affinity for oxygen, and thus provides a wet medium with the capabilities of improved oxygen dispersal throughout the reaction zone 3 within reactor 10. In the prior art one of the critical considerations is maintaining water under sufficient pressure to keep it in the liquid phase, otherwise the water would separate from the slurry as vapor thus leaving a relatively cohesive mass of solid material. Such cohesive mass is difficult to oxidize and often becomes an additional problem in plugging the flow patterns within the reactor.

In the methods of the present invention the principal carrier liquid is selected preferably as a liquid with a specific gravity greater than that of water. Thus the water introduced into the reactor as well as the water generated by reaction will separate from the carrier liquid and collect in zone 2 in the liquid phase and in zone 1 in the vapor phase. Thus the carrier liquid continues its function in maintaining a slurry within zone 3 and thus avoiding the problem of the prior art wherein masses of cohesive solids accumulate. Such an arrangement eliminates the requirement of keeping water in the liquid phase, thus permitting operations at substantially lower pressures. Further the carrier liquid of the present invention, with its inherent ability to take oxygen into solution, provides a medium for reasonably uniform distribution of oxygen for reaction with the oxidizable material dispersed through reaction zone 3. As oxygen is taken out of solution from the carrier liquid, in reaction with the oxidizable material, make-up oxygen is provided by injecting additional oxygen into reactor 10. Such make-up oxygen is further dispersed by the carrier liquid.

Generally it is preferable that the oxidizable substances to be subjected to the methods of the present invention be preprocessed to some extent to remove obvious noncombustible materials such as dirt, glass and certain metals. As a minimum, noncombustible material of sufficient size to interfere with pumping actions of the slurry should be removed prior to injecting the slurry into reactor 10. Noncombustible material entering reactor 10 generally will fall into two categories upon becoming residual after the wet oxidation reactions: finely dispersed ash that will become suspended in the carrier liquid and thus will accompany the carrier liquid as it exits from reactor 10 through flow line 20, and heavy ash that will settle to the bottom of reactor 10 and is withdrawn as a sludge through flow line 39. In both cases it is preferred that the ash be separated from the carrier liquid by any convenient method and that the carrier liquid be saved for recycling into the reactor 10. In some cases the ash contains valuable constituents which are recovered.

The heat exchangers used in the methods of the present invention can be of any convenient configuration capable of transferring large quantities of heat to and from fluids. In some cases it may be desirable to use heat exchanger designs that will facilitate reasonably uniform fluid flow of ascending fluids within reactor 10. Certain items of auxiliary equipment are required for the methods of the present invention. Such items are commonly available such as pumps to raise the pressure of injected fluids prior to injection into reactor 10, and include equipment for pressure let down for fluids withdrawn from reactor 10, equipment used for separation of solids from liquids, equipment used for separation of liquids from gases, and the like.

EXAMPLE NO. 1

By way of example cellulose in the form of paper or cardboard is shredded into chips of relatively small size, for example, $\frac{1}{8}" \times \frac{1}{8}" \times 1"$. A suitable inert oxygen-carrier liquid is selected, preferably tri(perfluoroocthyl)amine $(C_8F_{17})_3N$, a liquid that will readily absorb 3.72 pounds of oxygen within each 1000 pounds of carrier fluid. The carrier liquid is loaded with oxygen by any convenient method, and then cellulose in introduced into the carrier liquid to form a slurry, preferably a 10% solids slurry.

The process within the reactor begins by opening valve 12, then opening valve 33 to permit introduction of oxygen-carrier liquid loaded with oxygen into reactor 10. Injection of the carrier liquid continues until the liquid level approximates level 19 shown on the drawing, with all other valves closed. Valve 12 is then closed and injection continues through flow line 32 until the reactor pressure near valve 12 reaches the planned operating pressure, for example 588 psia. Reactor 10 is suitably insulated (not shown) to minimize heat losses to the ambient environment.

With all valves closed and the contents of reactor 10 at ambient temperature, reactor startup is begun by activating heat exchanger 23. Hot fluid, for example at a temperature of 530° F. (277° C.) is circulated through heat exchanger 23 in order to heat the carrier liquid in the lower portion of zone 3 to a temperature near that of planned operating conditions, for example 480° F. (249° C.).

The hot fluid initially injected into heat exchanger 23 may be from any convenient source, for example steam. After the exothermic reactions within reactor 10 become stabilized in operation as described hereinafter, heat required in heat exchanger 23 can be supplied from surplus heat of the reactions, for examples, by circulating hot stripped carrier liquid withdrawn from flow line 20, or by hot fluid from flow line 15 or by hot fluid from flow line 45.

With preheat initiated by heat exchanger 23, additional startup steps are accomplished by opening valves 29, 33 and 21, with injection rates through flow lines 28, 32 operating in concert with the withdrawal rate through flow line 20 in order to maintain the desired pressure in reactor 10, preferably 588 psia as measured at a point near valve 12. In this mode the carrier liquid-cellulose slurry is injected through flow line 28, the inert oxygen-carrier liquid is injected through flow line 32, and carrier liquid is withdrawn through flow line 20.

Within a relatively short time, for example approximately three minutes, reaction zone 3 will be up to planned operating conditions, for example an average temperature of 480° F. (249° C.) within zone 3 and pressures within zone 3 corresponding to 588 psia plus the added pressure of the fluid head. The planned reactions will be underway for wet oxidizing cellulose into carbon dioxide, water and residual ash.

With planned reactions stabilized, valve 12 is opened to the extent necessary to withdraw carbon dioxide at the rate at which it is generated. Also valve 41 is opened to the extent necessary to withdraw water at the rate at which it is generated. With all of the valves operating in concert as described heretofore, the gas-light liquid interface is maintained at level 37 and the light liquid-heavy liquid interface is maintained at level 19.

The exothermic heat of the wet oxidation reactions will cause a temperature rise above planned operating temperature unless heat is withdrawn from the reactor. Accordingly heat exchanger 14 is activated by circulating a heat receptive fluid, for example water, through flow line 17 and withdrawing heat through flow line 15 in fluid form, for example steam. Likewise heat exchanger 44 is activated for further withdrawal of surplus heat. Heat surplus to the processes of the invention are then directed to other facilities (not shown) for further useful work.

It is preferable to supersaturate the inert oxygen-carrier liquid with oxygen as it enters reactor 10. Such supersaturation can be accomplished by injecting oxygen through flow line 36 at a release point within flow line 32. Preferably the release point is positioned within venturi 31 so that oxygen is reasonably uniformly distributed through the inert carrier liquid being injected through flow line 32. Likewise it is preferable that the carrier liquid supersaturated with oxygen be intimately mixed with the injected cellulose slurry as the combined fluids enter reactor 10. The preferred mixing, as an example, can be accomplished by passing the cellulose slurry through venturi 30 while injecting the oxygen carrier liquid through nozzle 31.

By way of example, the methods are described in terms of injecting five tons per hour of cellulose material into reactor 10, such material being composed of 95.5% cellulose, 4% moisture and 0.5% ash. For complete oxidation of the cellulose, 10,186 pounds of oxygen per hour will be required, such oxygen accompanying the carrier liquid as dissolved oxygen and entrained oxygen. Carrier liquid entering reactor 10 via flow lines 28 and 36, preferably has a combined injection rate of 22,804 pounds per minute carrying 169.67 pounds of oxygen. As described the residence time within reactor 10 is five minutes, during which time period the products of reaction will be 1166.66 pounds of carbon dioxide, 510.83 pounds of water and 4.17 pounds of ash.

During each hour of operation exothermic heat generated amounts to approximately 81 million Btu. Preferably such heat is recovered in useful form, for example steam, and at normal heat exchange efficiencies approximately 65 mil. Btu/hour would be available for further useful work.

EXAMPLE NO. 2

By way of example a uraniferous coal is described such as that found in several of the western states of the United States, wherein uranium values have been reduced from percolating water and deposited within the coal. It is not uncommon to find such uraniferous coals with a uranium content of 0.02%, an ash content of 10%, a moisture content of 20% and a heat content approximating 7500 Btu per pound. Commonly the uranium values within the coal will survive burning the coal to ash with the uranium values remaining in the ash. As described the uranium values in the ash would approximate a concentration of 0.20%, and as such would represent the equivalent of commercial uranium ore. Such uraniferous coals lend themselves to wet oxidation with the exothermic heat captured for further useful work and the residual ash captured for conversion into yellow cake.

Preferably such uraniferous coal is crushed or otherwise reduced in particle size for serving as the solids portion of a slurry. Unlike the slurry in Example No. 1 previously described, the preferred slurry would have a relatively high solids content, for example up to 80% solids by weight. Like the slurry in Example No. 1 previously described, the carrier liquid would be an inert liquid with an affinity for oxygen, tri(perfluorooctyl)amine. Thus the carrier liquid would serve to suspend the solids of the slurry and in addition serve as the vehicle for conveying the oxygen required for wet oxidation.

Referring now to the drawing, the process begins within reactor 10 using identical steps as described in Example No. 1 above, wherein oxygen carrier liquid is introduced into the reactor, pressure is increased within the reactor, temperature is increased within the reaction zone 3, slurry is injected through flow line 28, oxygen carrier liquid is injected through flow line 32, oxygen is injected through flow line 32 and carrier liquid is withdrawn through flow line 20.

Within a relatively short time for example approximately three minutes, reaction zone 3 will be up to planned operating conditions for example an average temperature of 480° F. (249° C.) within zone 3 and pressures within zone 3 corresponding to 588 psia plus the added pressure of fluid head. The planned reactions will be underway to wet oxidize coal into carbon dioxide, water and residual ash.

With planned operations stabilized, valve 12 is opened to the extent necessary to withdraw carbon dioxide at the rate at which it is generated. Valve 41 is opened to the extent necessary to withdraw water at the rate which it accumulates. Valve 42 is opened to the extent necessary to withdraw ash sludge at the rate which it accumulates. With all of the valves operating in concert, the gas-light liquid interface is maintained at level 37, the light liquid-heavy liquid interface is maintained at level 19, and the heavy liquid-sludge interface is maintained at level 38.

The exothermic heat of wet oxidation reactions will cause a temperature rise fabove planned operating temperatures unless heat is withdrawing from the reactor. Accordingly, heat exchangers 14 and 44 are activated as more fully described in Example No. 1 above.

By way of example, the methods are described in terms of injecting five tons per hour of coal into reactor 10 in a slurry composed of 30% oxygen carrier liquid and 70% solids as coal. Like Example No. 1 described above, the carrier liquid for the slurry is saturated with oxygen and supplemental oxygen required is injected into reactor 10 through flow line 36. Unlike Example No. 1 described above, valve 33 is closed when reactions become stabilized in reaction zone 3, and thus the withdrawals of carrier liquid from the reactor are significantly reduced to the amount of carrier liquid injected through flow line 28.

In this mode a slurry composed of 71.4 pounds of carrier liquid carrying 0.26 pounds of oxygen with 166.7 pounds of uraniferous coal suspended enters reactor 10 each minute. Simultaneously each minute 348.6 pounds of oxygen enters reactor 10 via flow line 36. Withdrawn from the reactor each minute are 64.2 pounds of stripped carrier liquid, 397 pounds of carbon dioxide, 100.9 pounds of water and 23.9 pounds of sludge containing 16.7 pounds of ash, 7.2 pounds of carrier liquid and 0.03 pounds of uranium exothermic heat generated approximates 75 million Btu per hour. Preferably the excess heat is captured in useful form, for example steam, and at normal heat exchange efficiencies approximately 60 million Btu/hour would be available for further useful work. Another valuable by-product would be two pounds pwer hour of uranium contained in the sludge.

Coal described in this example is useful for the heat it generates, plus the ash may be further processed as uranium ore. In other coals there are sometimes found other minerals such as vanadium, chromium, germanium, nickel and the like, which also may become concentrated in the residual ash in quantities of commercial interest. Such coals may be processed using the methods of the present invention.

In some cases all of the coal may not be fully oxidized in the first pass through the reactor. In those cases the unreacted residual coal can be recycled in the slurry until oxidation is complete.

As described in Examples Nos. 1 and 2 in the foregoing the oxidizer used is oxygen. Other sources of oxygen may also be used in the methods of the present invention, including the injection of air. When air is used as the oxidizer, corresponding greater volumes of gases will be withdrawn from the reactor. Such gases will be composed substantially of carbon dioxide, nitrogen and water vapor.

Thus it may be seen that materials with an unfulfilled chemical oxygen demand can be fully oxidized in a pressure vessel at superatmospheric pressures and temperatures in a wet environment created by an inert liquid that is capable of absorbing and dispensing oxygen, that the solid residue may be captured apart from the inert oxygen-carrier liquid, and that a substantial amount of the exothermic heat of reaction may be captured apart for further useful work.

While the present invention has been described with a certain degree of particularity, it is understood that the present disclosure has been made by way of example and that changes in detail of structure may be made without departing from the spirit thereof.

What is claimed is:

1. A method of wet oxidizing cellulose into ash residue comprising the steps of establishing a reaction zone, the said reaction zone being maintained both within the range of temperatures between 100° F. and 610° F. and within the range of pressures between 30 psia and 3200 psia, injecting into the said reaction zone a slurry composed of cellulose suspended in a liquid, the said liquid being inert and having the capability of taking oxygen into solution and being selected from a group of fluorocarbons containing eight or more carbon atoms, injecting oxygen into the said slurry, and wet oxidizing the said cellulose into residue.

2. The method of claim 1 further including the steps of withdrawing the gaseous products of oxidation reactions from the said reaction zone, withdrawing the said fluorocarbon from the said reaction zone, and withdrawing the said residue from the said reaction zone.

3. The method of claim 1 further including the step of withdrawing heat from the said reaction zone.

* * * * *